July 28, 1959  E. J. MARAK  2,897,247
LIGHT SCATTERING DEVICE AND CONTROL SYSTEM
Filed June 16, 1955  3 Sheets-Sheet 1

INVENTOR.
E. J. MARAK
BY
Hudson & Young
ATTORNEYS

July 28, 1959 E. J. MARAK 2,897,247
LIGHT SCATTERING DEVICE AND CONTROL SYSTEM
Filed June 16, 1955 3 Sheets-Sheet 2

INVENTOR.
E. J. MARAK
BY Hudson & Young
ATTORNEYS

INVENTOR.
E. J. MARAK

BY Hudson & Young

ATTORNEYS

United States Patent Office 2,897,247
Patented July 28, 1959

2,897,247

LIGHT SCATTERING DEVICE AND CONTROL SYSTEM

Eldon J. Marak, Dewey, Okla., assignor to Phillips Petroleum Company, a corporation of Delaware Application June 16, 1955, Serial No. 515,941

10 Claims. (Cl. 260—683.15)

This invention relates to apparatus to measure the ratio of light transmitted through a material to the light scattered therefrom at various angles. In another aspect it relates to a polymerization control system based upon a measurement of the molecular weight of the polymer produced.

Valuable information can be obtained regarding the molecular weight and the structure of a material by light scattering measurements. A beam of radiation is directed into a sample of the material to be tested. The ratio of light scattered from the material at a given angle to the light transmitted directly through the material is a function of the molecular weight of the material.

In accordance with the present invention improved apparatus is provided to make measurements of this type. A beam of light is directed into a sample of the material to be tested. The light transmitted through the material is focused on a first detecting element. The light scattered from the sample is measured by a second detecting element which is adapted to be positioned to intercept light scattered to selected angles. The output signals of the two detecting elements are compared by a novel voltage detecting circuit which incorporates a synchronous rectifier. The reference voltage applied to the rectifier circuit is derived from the output signal of the first detecting element which measures the transmitted light. This provides a reference voltage which is in phase with the output signals of the two detecting elements.

In accordance with another aspect of this invention a system is provided to control a polymerization reaction to produce a polymer of desired molecular weight. A sample of the product material is circulated continuously through a sample cell in the light scattering apparatus. The ratio of the scattered light to the transmitted light is a function of the molecular weight of the material in the sample cell. A signal representative of this ratio is applied through suitable control mechanism to adjust a variable in the polymerization system which affects the molecular weight of the polymer produced. For example, the flow rates of the reactant materials, the temperature of the reactor and the pressure in the reactor can be adjusted to maintain the molecular weight of the product at a desired value.

Accordingly, it is an object of this invention to provide improved light scattering measuring apparatus.

Another object is to provide improved apparatus to compare the magnitudes of two beams of radiation.

A further object is to provide a method of and apparatus for controlling a polymerization reaction in response to a measurement of the molecular weight of the produced polymer.

Other objects, advantages and features of the invention should become apparent from the following detailed description taken in conjunction with the accompanying drawing in which.

Figure 1:
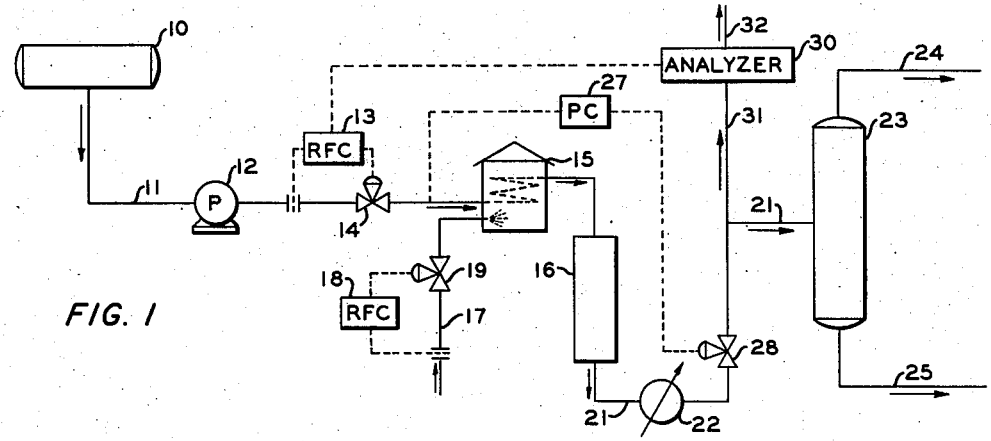
Figure 1 is a schematic representation of a polymerization system controlled in accordance with the present invention.

Referring now to the drawing in detail, and to Figure 1 in particular, there is shown a polymerization system wherein a monomer or mixture of monomers to be polymerized is supplied from a storage tank 10 through a conduit 11 having a pump 12 therein. The flow through conduit 11 is maintained at a desired rate by a rate-of-flow controller 13 which adjusts a valve 14. Conduit 11 passes through a heater 15 and communicates with the inlet of a catalyst containing reaction chamber 16. Fuel is supplied to a burner in heater 15 through a conduit 17 at a rate which is adjusted by a rate-of-flow controller 18 that adjusts a valve 19. The outlet of reaction chamber 16 communicates with a conduit 21 which passes through a cooler 22. The second end of conduit 21 communicates with the inlet of a fractionation column 23 which separates the reaction products into an overhead product stream 24 and a bottom product stream 25. The pressure in reaction chamber 16 is maintained at a desired value by a pressure controller 27 which adjusts a valve 28 in conduit 21 in response to a measurement of the pressure in conduit 11 upstream from furnace 15.

A sample of the reaction products is directed from conduit 21 through a conduit 31 to the inlet of an analyzer 30. This sample stream is vented from analyzer 30 through a conduit 32. Analyzer 30 determines the average molecular weight of the sample supplied thereto. The output signal of this analyzer is employed to override flow controller 13 so that the material to be polymerized is supplied to reactor 16 at such a rate that the resulting polymer has a predetermined molecular weight. This control system is described in greater detail hereinafter.

Figure 2:
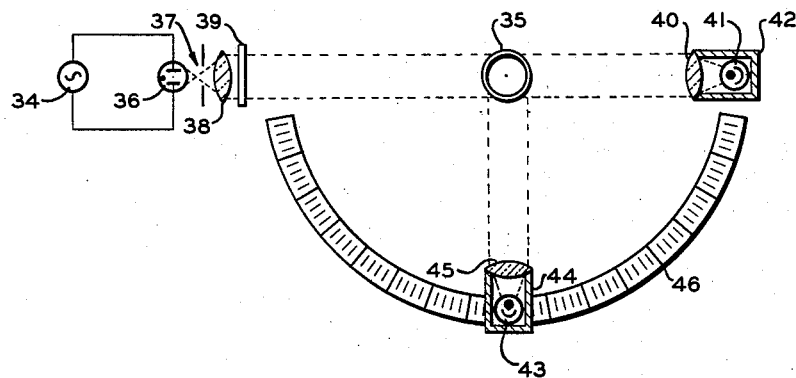
Figure 2 is a schematic representation of the optical system of the light scattering apparatus of this invention.

The optical components of the light scattering apparatus of this invention are illustrated schematically in Figure 2. The material to be tested is contained in a transparent cylindrical sample cell 35. Sample cell 35 can be supplied with an inlet and an outlet conduit, not shown, to circulate the material to be investigated therethrough continuously. Fluctuating radiation is supplied by a gas-filled discharge tube 36 which has a source of alternating voltage 34 connected thereacross. If source 34 provides a signal at a frequency of 60 cycles per second, for example, radiation is emitted from tube 36 at a frequency of 120 cycles per second because the tube is conductive during a portion of each half cycle of the applied voltage. A portion of the radiation emitted from tube 36 is directed through an aperture 37. A collimating lens 38 is positioned adjacent aperture 37 to direct a beam of radiation into sample cell 35. A filter 39 is positioned in the beam to limit the transmitted radiation to selected wave lengths. Discharge tube 36 can be a mercury tube so that radiation characteristics of the emission spectrum of mercury at 4358, 5461, and 5780 Angstrom units is provided. The light transmitted through sample cell 35 is focused by a lens 40 on a first photocell 41 which is contained in a light opaque housing 42. A second photocell 43 is contained in a second light opaque housing 44. A converging lens 45 is positioned across the face of housing 44. Housing 44 is slidably mounted on a semi-circular guide 46 to intercept light scattered from cell 35 at any selected angle. Guide 46 is graduated to provide a measurement of the angle at which the scattered light is measured.

Figure 3:
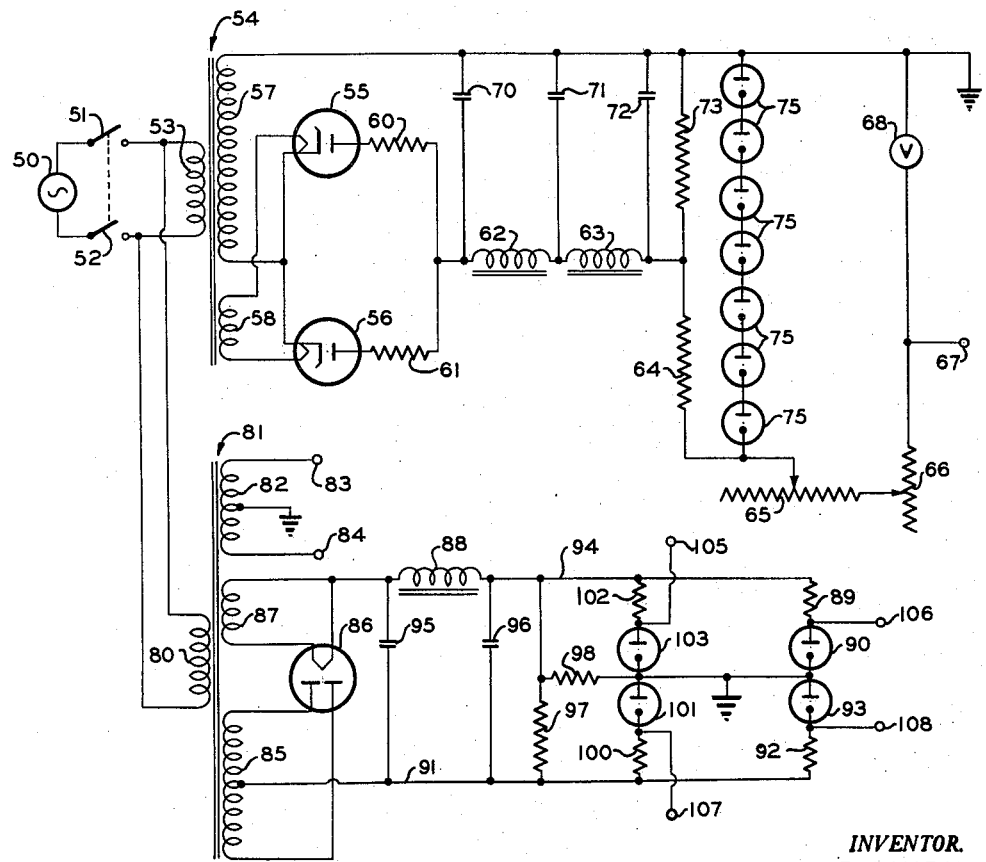
Figure 3 is a schematic circuit diagram of the power supply circuit employed to energize the electrical measuring circuit.

The electrical system employed to compare the output signals of photocells 41 and 43 is energized from the power supply circuit illustrated in Figure 3. This power supply circuit is energized from a source of alternating current 50 which is connected by switches 51 and 52 across the primary winding 53 of a transformer 54. A pair of diodes 55 and 56 is connected in the output circuit of the transformer. One end terminal of the first secondary winding 57 of transformer 54 is connected to the cathodes of diodes 55 and 56. The second end terminal of transformer winding 57 is connected to ground. The heaters of diodes 55 and 56 are energized by a second secondary winding 58 of transformer 54. The first terminal of a resistor 60 is connected to the anode of diode 55, and the first terminal of a resistor 61 is connected to the anode of diode 56. The second terminals of resistors 60 and 61 are connected to one another and to the first terminal of an inductor 62. The second terminal of inductor 62 is connected to the first terminal of a second inductor 63. The second terminal of inductor 63 is connected through a resistor 64 to the contactor of a variable resistor 65. A first capacitor 70 is connected between ground and the connected second terminals of resistors 60 and 61; a second capacitor 71 is connected between ground and the junction between inductors 62 and 63; and a third capacitor 72 is connected between ground and the junction between inductor 63 and resistor 64. A resistor 73 is connected in parallel with capacitor 72. A plurality of voltage regulating tubes 75 is connected in series relationship between ground and the contactor of resistor 65. The end terminal of resistor 65 is connected to the contactor of a second variable resistor 66. The end terminal of resistor 66 is connected to an output terminal 67 which is maintained at a negative potential. The potential at terminal 67 is applied to the photocathodes of photomultiplier tubes 42 and 43. A voltmeter 68 is connected between terminal 67 and ground.

The operation of the power supply circuit thus far described should readily be apparent. Diodes 55 and 56 rectify the alternating current supplied by transformer 54. This current is filtered to supply a steady output potential. The voltage regulating tubes are employed to maintain this potential constant. In one specific example of this power supply circuit, the following circuit components were employed. Current source 50 supplied 115 volt alternating current at a frequency of 60 cycles per second. The potential appearing across transformer winding 57 was 1200 volts. Diodes 55 and 56 were 2X2A tubes, and tubes 75 were each OA2 tubes. Resistors 60 and 61 were 4400 ohms each; resistor 73, 2.2 megohms; resistor 64, 20,000 ohms; resistor 65, 500,000 ohms; resistor 66, 150,000 ohms; and capacitors 70, 71 and 72, 1.0 microfarad each. Resistor 65 thus provides a coarse adjustment of the output voltage, whereas resistor 66 provides a fine adjustment. The output potential at terminal 67 can be adjusted from −600 volts to −1050 volts.

The second portion of the power supply circuit is illustrated in the lower portion of Figure 3. Current source 50 is applied across the primary winding 80 of a transformer 81. The end terminals of the first secondary winding 82 of transformer 81 are connected to respective output terminals 83 and 84 to provide an alternating current source. The center tap of transformer winding 82 is connected to ground. The end terminals of a second secondary winding 85 of transformer 81 are connected to the respective anodes of a double diode 86. The terminals of the filament of diode 86 are connected to the respective end terminals of a third secondary transformer winding 87. One end terminal of transformer winding 87 is connected through an inductor 88, a resistor 89 and a voltage regulating tube 90 to ground. The center tap of transformer winding 85 is connected by a lead 91, a resistor 92 and a voltage regulating tube 93 to ground. A first capacitor 95 is connected between the first terminal of transformer winding 87 and lead 91. A second capacitor 96 is connected between lead 91 and the junction between inductor 88 and resistor 89. A resistor 97 is connected in parallel with capacitor 96. A resistor 98 is connected between ground and the junction between inductor 88 and resistor 89. A resistor 100 and a voltage regulating tube 101 are connected in series relationship between lead 91 and ground. A resistor 102 and a voltage regulating tube 103 are connected in series relationship between leads 94 and ground. A first positive output terminal 105 is connected to the junction between resistor 102 and tube 103. A second positive terminal 106 is connected between resistors 89 and tube 90. A first negative terminal 107 is connected to the junction between resistors 100 and tube 101. A second negative terminal 108 is connected to the junction between resistor 92 and tube 93.

In the example previously described the circuit components in the lower portion of Figure 3 were as follows: resistors 97 and 98, 470,000 ohms each; resistors 102 and 89, 2500 ohms each; resistor 100, 2000 ohms; resistor 92, 1250 ohms; capacitors 95 and 96, 20 microfarads each; diode 86 was a tube type 5Y3 and voltage regulating tubes 90, 101 and 103 were each tubes OB2, and 93 was a tube OA2. Terminals 105 and 106 were each maintained at 107 volts. Terminal 107 was maintained at −107 volts and terminal 108 was maintained at −150 volts. The potential between terminals 83 and 84 was 6.3 volts.

Figure 4:
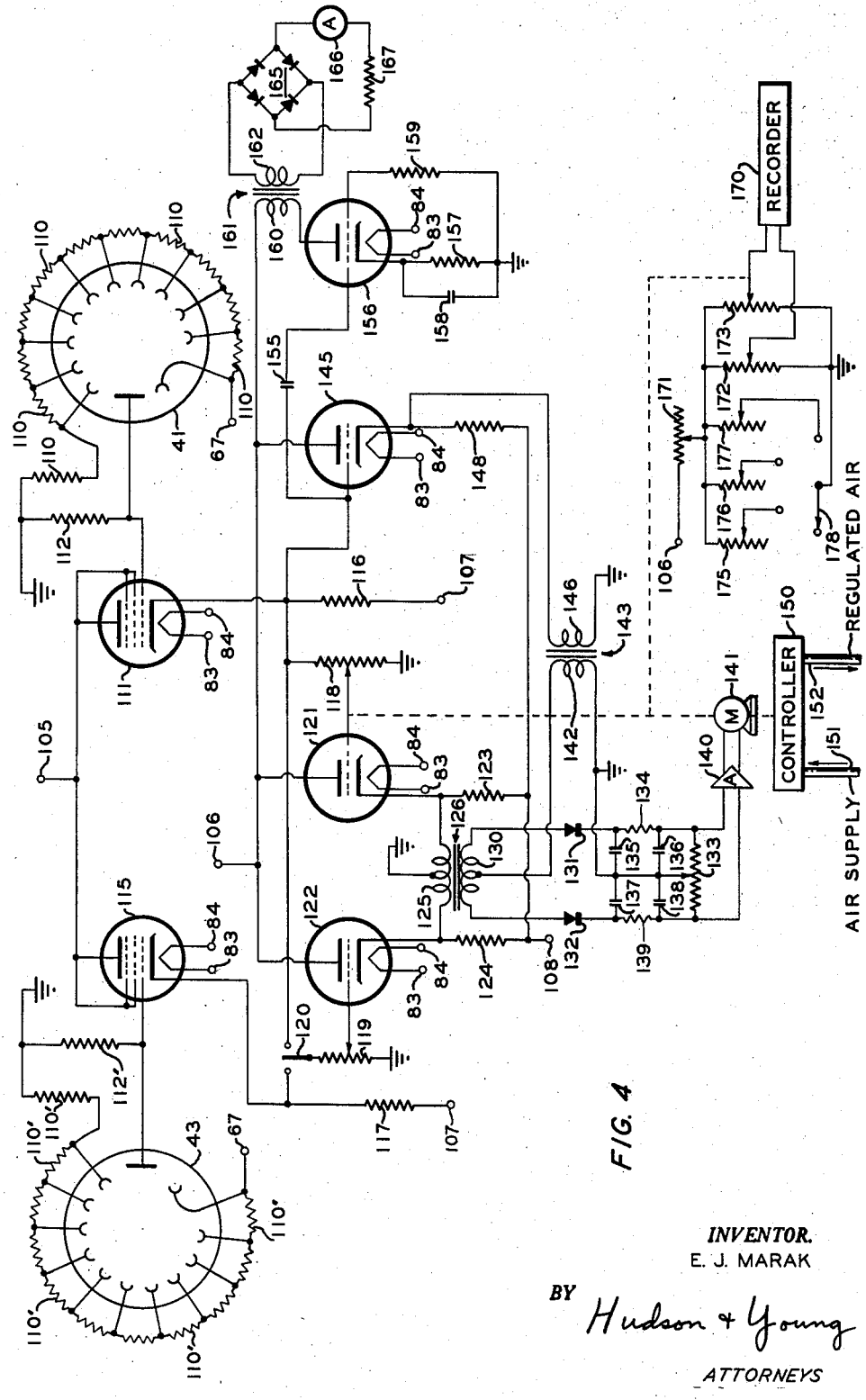
Figure 4 is a schematic circuit drawing of the measuring circuit employed in conjunction with the analyzer of Figure 2.

The measuring circuit associated with photomultiplier tubes 41 and 43 is illustrated in Figure 4. Negative potential terminal 67 is connected to the photocathodes of the two tubes. A resistor 110 is connected between the photocathode of tube 41 and the adjacent dynode. Corresponding resistors 110 are connected between adjacent dynodes in the tube, and a resistor 110 is connected between the dynode adjacent the anode and ground. The anode of tube 41 is connected to the control grid of a pentode 111. A resistor 112 is connected between control grid of pentode 111 and ground. The anode, the suppressor grid and the screen grid of pentode 111 are connected to positive potential terminal 105. Resistors 110' are connected between adjacent elements of tube 43 corresponding to resistors 110 of tube 41. The anode of tube 43 is connected to the control grid of a pentode 115. A resistor 112' is connected between this control grid and ground. The anode, the suppressor grid and the screen grid of pentode 115 are connected to positive potential terminal 105. Pentodes 111 and 115 are thus connected substantially as triodes. The cathodes of pentodes 111 and 115 are connected to negative potential terminal 107 through respective resistors 116 and 117. The heaters of pentodes 111 and 115 are connected to terminals 83 and 84. One end terminal of a potentiometer 118 is connected to the cathode of pentode 111. The second end terminal of this potentiometer is connected to ground. The first end terminal of a potentiometer 119 is connected by a switch 120 selectively to the cathode of pentode 115 and to the cathode of pentode 111. The second end terminal of potentiometer 119 is connected to ground. The contactors of potentiometers 118 and 119 are connected to the control grids of respective triodes 121 and 122. The anodes of triodes 121 and 122 are connected to positive potential terminal 106. The cathodes of triodes 121 and 122 are connected through respective resistors 123 and 124 to negative potential terminal 108. The cathodes of triodes 121 and 122 are also connected to the respective end terminals of the primary winding 125 of a transformer 126. The center tap of transformer winding 125 is connected to ground.

The end terminals of the secondary winding 130 of transformer 126 are connected to corresponding terminals of respective rectifiers 131 and 132. The second terminals of these rectifiers are connected to the respective end terminals of a potentiometer 133 through respective resistors 134 and 139. The contactor of potentiometer 133 is connected to ground. Capacitors 135 and 136 are connected between ground and the end terminals of resistor 134. Capacitors 137 and 138 are connected between ground and the end terminals of resistor 139. The end terminals of potentiometer 133 are connected to the respective input terminals of a servo amplifier 140 which drives a reversible motor 141. The drive shaft of motor 141 is mechanically coupled to the contactor of potentiometer 118. The center tap of transformer winding 130 is connected to ground through the secondary winding 142 of a transformer 143. The cathode of pentode 111 is connected to the control grid of a triode 145. The cathode of triode 145 is connected to ground through the primary winding 146 of transformer 143. The anode of triode 145 is connected to positive potential terminal 106. The cathode of triode 145 is connected through a resistor 148 to negative potential terminal 108.

In normal operation of the circuit thus far described, switch 120 is moved so that potentiometer 119 is connected to the cathode of pentode 115. The conductance through pentode 111 is a function of the radiation incident upon photomultiplier tube 41 so that the voltage applied to the control grid of triode 121 is representative of the radiation incident upon tube 41. The conductance through pentode 115 is a function of the radiation incident upon photomultiplier tube 43 so that the voltage applied to the control grid of triode 122 is representative of the radiation incident upon tube 43. If the potentials applied to the control grids of triodes 121 and 122 are equal there is no potential difference across the primary winding 125 of transformer 126. However, any difference in potentials applied to the control grids of triodes 121 and 122 results in current flow through transformer winding 125 in a direction representative of the triodes which is conducting the greater current. Any current flow through transformer winding 125 induces a voltage in the secondary winding 130 which causes current flow through rectifiers 131 and 132 on alternate half cycles. The current through these rectifiers is filtered so that the potentials at the two end terminals of potentiometer 133 are equal. However, the voltage appearing at the cathode of pentode 111 is applied through cathode follower 145 to the primary winding 146 of transformer 143. This induces a voltage across the secondary winding 142 which is added to the voltage appearing across one-half of transformer winding 130, but which is subtracted from the voltage appearing across the other half of transformer winding 130. This results in greater conductance through one of the rectifiers than the other so that a potential appears across potentiometer 143, the phase of which is determined by the triodes 121 and 122 that is more conductive.

Any potential difference across the end terminals of potentiometer 133 drives motor 141 to adjust the contactor of potentiometer 118. The rotation of motor 141 is in a direction so that potentiometer 118 is adjusted until triodes 121 and 122 conduct equally. The amount of rotation of motor 141 needed to restore this condition of balance is a measurement of a deviation in the ratio of radiation incident upon photomultiplier tubes 43 and 41. The drive shaft of motor 141 is also coupled to a suitable control instrument, such as a pneumatic controller 150. Air is supplied to controller 150 by a conduit 151. The drive shaft of motor 141 adjusts a valve in controller 150 so that the output air pressure in conduit 152 is a function of the position of the drive shaft of motor 141.

If it is desired to check the linearity of potentiometers 118 and 119, switch 120 is moved so that the two potentiometers are connected in parallel. This applies a common signal from tube 41 across the two potentiometers.

It has been found that the speed of response of the servo system is a maximum when the reference voltage applied to the control grid of triode 121 is in a predetermined range. This voltage can be measured by the circuit illustrated in the right-hand portion of Figure 4. The signal applied to the control grid of triode 145 is applied through a capacitor 155 to the control grid of a triode 156. The cathode of triode 156 is connected to ground through a resistor 157 which is shunted by a capacitor 158. The control grid of triode 156 is connected to ground through a resistor 159. The anode of triode 156 is connected through the primary winding 160 of a transformer 161 to positive potential terminal 106. The secondary winding 162 of transformer 161 is connected across first opposite terminals of a full wave rectifier bridge circuit 165. An ammeter 166 and a resistor 167 are connected in series relationship with one another across the second pair of opposite terminals of the bridge circuit. The conduction through triode 156 is thus a function of radiation incident upon photomultiplier tube 141. This conduction is measured by ammeter 166 so that an indication is provided of the reference signal voltage. Potentiometers 65 and 66 of the power supply circuit of Figure 3 are adjusted to vary the negative potential on the photocathode of tube 41 until the desired current is read on ammeter 166.

The position of motor 141 is measured continuously by a recorder 170. Positive potential terminal 106 is connected to the end terminal of a variable resistor 171. The contactor of resistor 171 is connected to corresponding first end terminals of potentiometers 172 and 173. The second end terminals of these potentiometers are connected to ground. The contactors of these potentiometers are connected to the respective input terminals of recorder 170. The contactor of potentiometer 173 is mechanically coupled to the drive shaft of motor 141 so that the potential applied to recorder 170 is a function of the position of the drive shaft of motor 141. The sensitivity of the recording circuit is adjusted by selectively connecting potentiometers 175, 176 and 177 in parallel with potentiometers 172 and 173 by a switch 178.

In one particular application of the measuring circuit of this invention the values of the circuit components were as follows: resistors 110 and 110′, 180,000 ohms each except for the resistors between the photocathodes and first dynodes which were 360,000 ohms each; resistors 112 and 112′, 10 megohms each; resistors 116 and 117, 33,000 ohms each; potentiometers 118 and 119, 30,000 ohms each; resistor 148, 33,000 ohms; resistor 157, 820 ohms; resistor 159, 470,000 ohms; resistor 167, 10,000 ohms; resistors 134 and 139, 7,500 ohms each; potentiometer 133, 500 ohms; potentiometer 171, 28,500 ohms; potentiometers 172 and 173, 50 ohms each; potentiometer 175, 3 ohms; potentiometer 176, 7 ohms; potentiometer 177, 27.5 ohms; capacitors 135, 136, 137 and 138, 2 microfarads each; capacitor 158, 25 microfarads. photomultiplier tubes 41 and 43, type 6217; pentodes 111 and 115, type 6AU6; and triodes 121, 122, 145 and 156, each one-half of a tube 12AU7.

Referring again to Figure 1, the light scattering measuring apparatus of this invention is employed to control the polymerization process. Conduits 31 and 32 communicate with sample cell 35 so that a sample of the products from reaction chamber 16 is circulated through cell 35. It has been found that for any given angle, the ratio of scattered light to transmitted light is a function of the average molecular weight of the material in cell 35. For convenience, cell 43 can be positioned to detect light scattered at an angle of 90° from the incident beam. The bridge circuit is balanced initially so that an air pressure of predetermined magnitude is supplied from controller 150 when the molecular weight of the material in cell 35 is of predetermined value. Any change in molecular weight of the sample material results in a variance of the analyzer output signal which changes the setting of flow controller 13 in Figure 13.

In various polymerization reactions the average molecular weight of the product materials is a function of the temperature, pressure and time of the reaction. Any one of these variables can be adjusted automatically in accordance with the present invention to control the molecular weight of the product material. Analyzer 30 of Figure 1 varies the rate of flow of monomer through catalyst chamber 16 to adjust the contact time. If the average molecular weight of the product should tend to increase, valve 14 is opened more to increase the flow rate and decrease the reaction time to diminish the average weight of the product materials. Conversely, valve 14 is closed more if the measured average weight of the product materials decreases.

The following example is illustrative of the operation of this control system. A feed stream having the following composition:

| Component: | Weight percent |
|---|---|
| Ethane | 12.30 |
| Propylene | 10.28 |
| Propane | 49.77 |
| Isobutene | 2.89 |
| Normal butene | 12.24 |
| Normal butane | 12.52 | was supplied to chamber 16, which had a silica-alumina catalyst therein, at a space velocity of 1.98 liquid volumes of feed per volume of catalyst per hour. The temperature at the inlet of chamber 16 was 413° F. The pressure in chamber was 500 pounds per square inch gage. The polymerized reaction products comprised 15.4 percent of polymer having a boiling point greater than 400° F. and 84.6 percent of polymer having at least five carbon atoms per molecule and boiling at a temperature less than 400° F. In another run under substantially the same conditions except that the space velocity was increased to 3.46 liquid volumes of feed per volume of catalyst per hour, the polymerized reaction products comprised only 7.5 percent of polymer having a boiling point greater than 400° F. This demonstrates that the flow rate of the feed determines the average molecular weight of the polymer produced.

Figure 5:
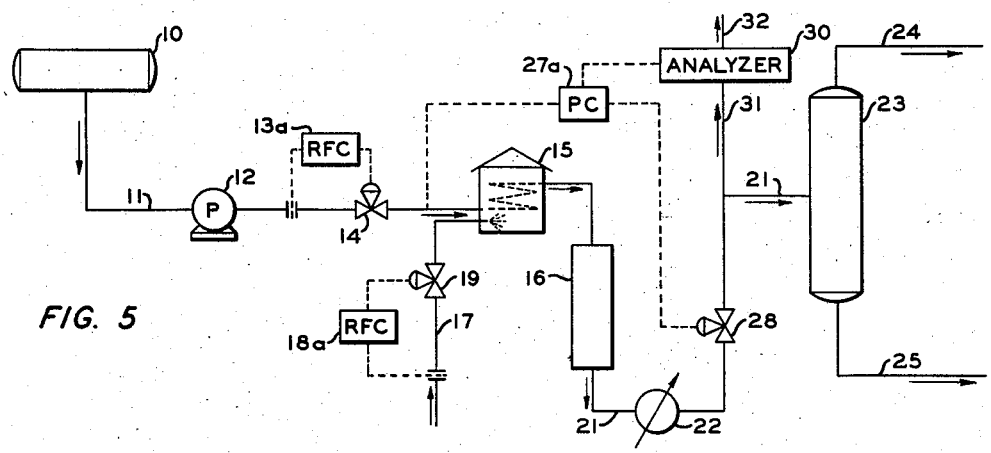
Figure 5 is a schematic representation of a second embodiment of the control system of this invention.

In Figure 5 there is shown a second embodiment of the control system which is similar to the system of Figure 1. However, the output signal of analyzer 30 controls the pressure in chamber 16 by resetting pressure controller 27a. If the measured average molecular weight increases above a desired value, the pressure in chamber 16 is decreased; and if the measured average molecular weight decreases, the pressure in chamber 16 is increased. In runs under conditions similar to those previously described it was found that the heavy polymer increased from 7.5 percent to 10.4 percent when the pressure increased from 500 pounds per square inch gage to 900 pounds per square inch gage, the other conditions remaining substantially constant.

Figure 6:
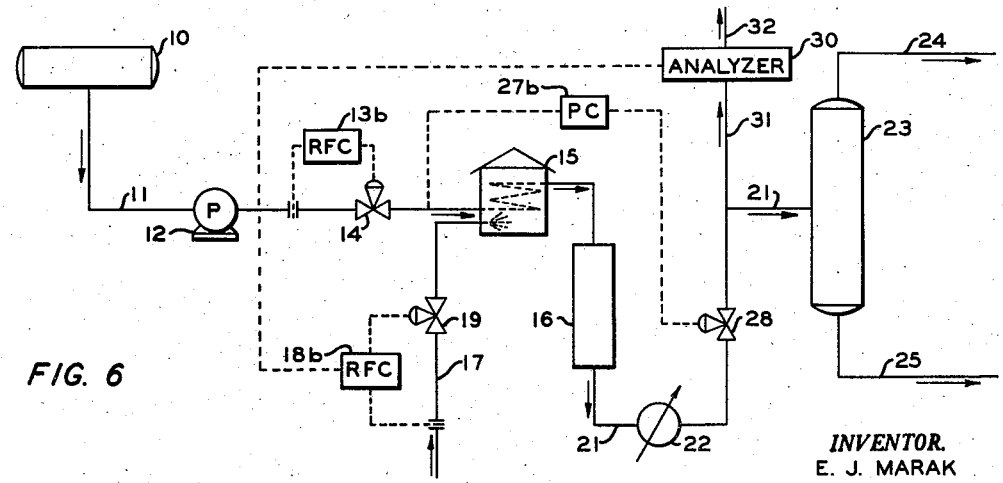
Figure 6 is a schematic representation of a third embodiment of the control system.

In Figure 6 there is shown a third embodiment of the control system which also is similar to the system of Figure 1. However, the output signal of analyzer 30 controls the fuel supplied to burner 15 by resetting flow controller 18b. This controls the preheating of the feed stream and thus the temperature of chamber 16. If the measured average molecular weight increases, the fuel supply is reduced to lower the reaction temperature; and if the molecular weight decreases, the fuel supply is increased. The molecular weight of the product increases with an increase of temperature.

Valuable information can be obtained regarding the molecular weight and structure of materials by measuring the ratio of scattered to transmitted light at various angles. Guide 46 of Figure 2 enables detector tube 43 to be positioned at any desired angle. Housing 44 can be moved slowly along guide 46 if readings at continuously varying angles are desired.

While the invention has been described in conjunction with present preferred embodiments it should be evident that the invention is not limited thereto.

What is claimed is:

1. The method of controlling a polymerization process to obtain a product having a desired molecular weight which comprises transmitting a beam of radiation into a sample of the polymerization product material, measuring the ratio of radiation scattered from said sample at a given angle to the transmitted radiation, and adjusting the temperature in the polymerization reactor so that the measured radiation ratio is maintained at a preselected value.

2. The method of controlling a polymerization process to obtain a product having a desired molecular weight which comprises transmitting a beam of radiation into a sample of the polymerization product material, measuring the ratio of radiation scattered from said sample at a given angle to the transmitted radiation, and adjusting the pressure in the polymerization reactor so that the measured radiation ratio is maintained at a preselected value.

3. Apparatus for use in measuring the molecular weight of materials comprising a container of transparent material, means to direct a beam of radiation into said container, which beam fluctuates in magnitude at a predetermined frequency, a first photo-conductive radiation detector positioned to receive radiation of said beam which is transmitted directly through said container, a second photo-conductive radiation detector positioned to receive radiation scattered from material in said container at a predetermined angle, means to establish first and second fluctuating voltages representative of radiation impinging upon said first and second detectors, respectively, and means to compare said voltages.

4. The combination in accordance with claim 3 wherein said means to compare voltages comprises a transformer, means applying said first and second voltages to the respective end terminals of the primary winding of said transformer, a resistor, a first rectifier connecting the first end terminal of said resistor to the first end terminal of the secondary winding of said transformer, a second rectifier connecting the second end terminal of said resistor to the second end terminal of the secondary winding of said transformer, means to apply a fluctuating potential of said predetermined frequency between a center tap on the secondary winding of said transformer and a point on said resistor between the end terminals thereof, and means to measure the potential drop across said resistor.

5. The combination in accordance with claim 4 wherein said means to apply said fluctuating potential comprises means responsive to said first radiation detector to establish a third fluctuating voltage representative of radiation impinging upon said first detector.

6. The combination in accordance with claim 4 wherein said means to measure the potential drop across said resistor comprises means responsive to said potential drop to vary the amplitude of said first voltage until said potential drop is zero, the amount the amplitude of said first voltage is varied being representative of changes in the potential drop across said resistor.

7. The combination in accordance with claim 3 wherein said radiation detectors comprise photomultiplier tubes.

8. Apparatus to compare first and second radiation beams which fluctuate in magnitude at a predetermined frequency comprising a first photomultiplier tube positioned to intercept said first beam, a second photomultiplier tube positioned to intercept said second beam, means to establish first and second fluctuating voltages representative of conduction by said first and second tubes, respectively, a transformer, means applying said first and second voltages to the respective end terminals of the primary winding of said transformer, a resistor, a first rectifier connecting the first end terminal of said resistor to the first end terminal of the secondary winding of said transformer, a second rectifier connecting the second end terminal of said resistor to the second end terminal of the secondary winding of said transformer, means to apply a fluctuating potential of said predetermined frequency between a center tap on the secondary winding of said transformer and a point on said resistor between the end terminals thereof, and means to measure the potential drop across said resistor.

9. The combination in accordance with claim 8 wherein said means to measure the potential drop across said resistor comprises means responsive to said potential drop to vary the amplitude of said first voltage until said potential drop is zero, the amount the amplitude of said first voltage is varied being representative of changes in the potential drop across said resistor.

10. The combination in accordance with claim 8 wherein said means to apply said fluctuating potential comprises means to establish a third fluctuating voltage representative of conduction by said first tube.

References Cited in the file of this patent

UNITED STATES PATENTS

| | | |
|---|---|---|
| 2,316,239 | Hare | Apr. 3, 1943 |
| 2,373,888 | Hachmuth | Apr. 17, 1945 |
| 2,421,946 | Ipatieff et al. | June 10, 1947 |
| 2,462,995 | Ritzmann | Mar. 1, 1949 |
| 2,547,212 | Jamison et al. | Apr. 3, 1951 |
| 2,690,694 | Wilson | Oct. 5, 1954 |